United States Patent
Kapinos et al.

(10) Patent No.: US 10,862,767 B2
(45) Date of Patent: Dec. 8, 2020

(54) DATA PACKET PREDICTION

(71) Applicant: LENOVO (Singapore) PTE. LTD., New Tech Park (SG)

(72) Inventors: Robert James Kapinos, Durham, NC (US); Scott Wentao Li, Cary, NC (US); Robert James Norton, Jr., Raleigh, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/367,135

(22) Filed: Mar. 27, 2019

(65) Prior Publication Data

US 2020/0313977 A1  Oct. 1, 2020

(51) Int. Cl.
*H04L 12/24* (2006.01)
*H04L 12/26* (2006.01)
*G06N 20/00* (2019.01)

(52) U.S. Cl.
CPC ............ *H04L 41/147* (2013.01); *G06N 20/00* (2019.01); *H04L 41/16* (2013.01); *H04L 43/04* (2013.01); *H04L 43/14* (2013.01)

(58) Field of Classification Search
CPC ....... H04L 41/16; H04L 41/147; H04L 43/04; H04L 43/14; G06N 20/00
USPC ........................................................ 709/224
See application file for complete search history.

(56) References Cited

U.S. PATENT DOCUMENTS

| | | | |
|---|---|---|---|
| 6,347,091 B1 * | 2/2002 | Wallentin ............... | H04W 28/18 370/437 |
| 2005/0063402 A1 * | 3/2005 | Rosengard .............. | H04L 47/13 370/412 |
| 2005/0276235 A1 * | 12/2005 | Lee ........................ | G10L 19/005 370/270 |
| 2009/0073974 A1 * | 3/2009 | Musoll .................... | H04L 45/00 370/389 |
| 2009/0086762 A1 * | 4/2009 | Kugler .................... | H04L 69/04 370/477 |
| 2012/0278432 A1 * | 11/2012 | Luna ....................... | H04L 47/10 709/217 |

(Continued)

OTHER PUBLICATIONS

Beata Bylina et al. "Using Markov chains for modelling networks", Annales UMCS Informatica Al 3 (2005) 27-34, 2005, pp. 27-34.

*Primary Examiner* — James E Springer
(74) *Attorney, Agent, or Firm* — Kunzler Bean & Adamson

(57) ABSTRACT

Apparatuses, methods, systems, and program products are disclosed for data packet prediction. An apparatus includes a processor and a memory that stores code executable by the processor. The code is executable by the processor to train a predictive model using incoming data packets. The incoming data packets are forwarded to one or more network devices. The predictive model is trained to predict a subsequent data packet based on an input data packet. The code is executable by the processor to forward the predictive model to the one or more network devices in response to the predictive accuracy of the predictive model satisfying a threshold accuracy. The predictive model generates predicted data packets at the one or more network devices. The code is executable by the processor to cease forwarding incoming data packets to the one or more network devices.

20 Claims, 5 Drawing Sheets

(56) References Cited

U.S. PATENT DOCUMENTS

| | | | | |
|---|---|---|---|---|
| 2013/0122821 A1* | 5/2013 | Yeung | ............... | H04W 52/0258 |
| | | | | 455/67.11 |
| 2014/0236873 A1* | 8/2014 | Viljoen | ................... | H04L 45/64 |
| | | | | 706/12 |
| 2018/0241700 A1* | 8/2018 | Sazawa | ............... | H04L 49/9057 |
| 2020/0076842 A1* | 3/2020 | Zhou | ................... | G06K 9/6232 |

* cited by examiner

DATA PACKET PREDICTION

FIELD

The subject matter disclosed herein relates to networks and more particularly relates to predicting data packets using machine learning.

BACKGROUND

At certain times, network traffic may include redundant data packets that are poorly synchronized in time such that the same data packets may be sent over a network numerous times. For instance, when content such as a video, a song, a game, a website, or the like is popular, the same data packets for the content may be transmitted to various different hosts such that a portion of the network traffic includes redundant data packets.

BRIEF SUMMARY

An apparatus for data packet prediction is disclosed. A method and computer program product also perform the functions of the apparatus. In one embodiment, an apparatus includes a processor and a memory that stores code executable by the processor. The code, in some embodiments, is executable by the processor to train a predictive model using incoming data packets. The incoming data packets are forwarded to one or more network devices. The predictive model is trained to predict a subsequent data packet based on an input data packet. The code, in further embodiments, is executable by the processor to forward the predictive model to the one or more network devices in response to the predictive accuracy of the predictive model satisfying a threshold accuracy. The predictive model may generate predicted data packets at the one or more network devices. The code, in various embodiments, is executable by the processor to cease forwarding incoming data packets to the one or more network devices.

In one embodiment, a method for data packet prediction includes training a predictive model using incoming data packets. The incoming data packets are forwarded to one or more network devices. The predictive model is trained to predict a subsequent data packet based on an input data packet. The method, in further embodiments, includes forwarding the predictive model to the one or more network devices in response to the predictive accuracy of the predictive model satisfying a threshold accuracy. The predictive model may generate predicted data packets at the one or more network devices. The method, in various embodiments, includes ceasing forwarding incoming data packets to the one or more network devices.

In one embodiment, a program product includes a computer readable storage medium that stores code executable by a processor. In certain embodiments, the executable code includes code to train a predictive model using incoming data packets. The incoming data packets are forwarded to one or more network devices. The predictive model is trained to predict a subsequent data packet based on the incoming data packets. The executable code, in further embodiments, includes code to forward the predictive model to the one or more network devices in response to the predictive accuracy of the predictive model satisfying a threshold accuracy. The predictive model may generate predicted data packets at the one or more network devices. The executable code, in various embodiments, includes code to cease forwarding incoming data packets to the one or more network devices.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
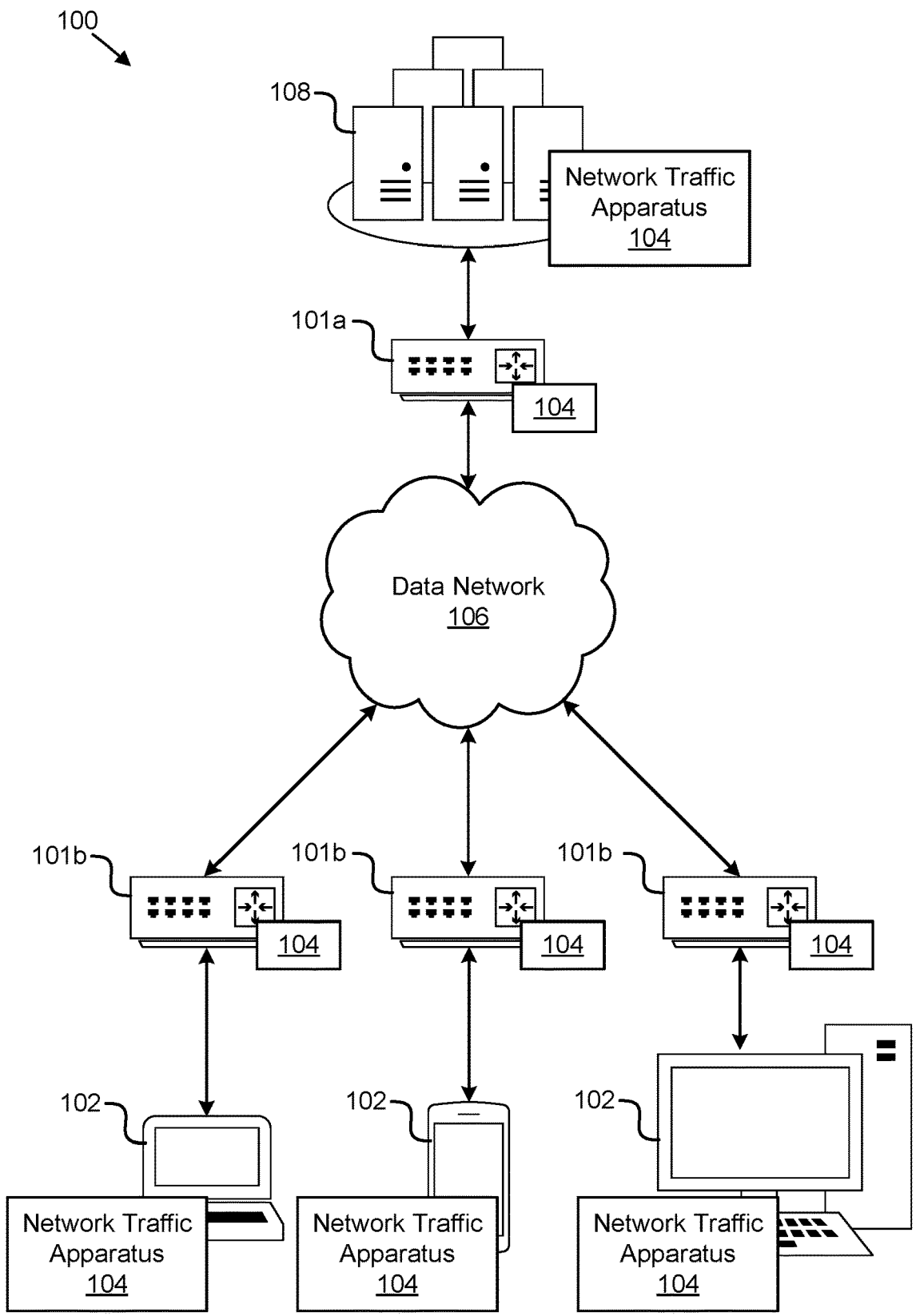
FIG. 1 is a schematic block diagram illustrating one embodiment of a system for data packet prediction.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for data packet prediction is disclosed. A method and computer program product also perform the functions of the apparatus. In one embodiment, an apparatus includes a processor and a memory that stores code executable by the processor. The code, in some embodiments, is executable by the processor to train a predictive model using incoming data packets. The incoming data packets are forwarded to one or more network devices. The predictive model is trained to predict a subsequent data packet based on an input data packet. The code, in further embodiments, is executable by the processor to forward the predictive model to the one or more network devices in response to the predictive accuracy of the predictive model satisfying a threshold accuracy. The predictive model may generate predicted data packets at the one or more network devices. The code, in various embodiments, is executable by the processor to cease forwarding incoming data packets to the one or more network devices.

In one embodiment, the code is further executable by the processor to notify the one or more network devices to cease accepting forwarded data packets and start generating predictive data packets using the predictive model. In certain embodiments, the code is further executable by the processor to periodically send a synchronization packet to the one or more network devices to indicate to the one or more network devices to continue generating predictive data packets using the predictive model. The synchronization packet may be sent over side-band connections to the one or more network devices.

In one embodiment, the code is further executable by the processor to detect that the predictive accuracy of the predictive model for incoming data packets does not satisfy the threshold accuracy and to notify the one or more network devices to cease generating predictive data packets and to accept forwarded data packets. The notification may be sent using side-band connections to the one or more network devices.

In certain embodiments, the code is further executable by the processor to continue training the predictive model on new incoming data packets. In some embodiments, the code is further executable by the processor to periodically forward incoming data packets to the one or more network devices to determine the predictive accuracy of the predictive model at the one or more network devices and to send a new version of the predictive model that is trained on the new incoming data packets to the one or more network devices for generating predictive data packets.

In one embodiment, the predictive model comprises a Markov chain model that is trained on the incoming data packets using a Markov chain engine. In some embodiments, the code is further executable by the processor to forward new incoming data packets to the one or more network devices after a predefined period of time to restart the Markov chain at the one or more network devices.

In one embodiment, the incoming data packets comprise sequential data packets for one or more of a video stream and an audio stream. In certain embodiments, the code is further executable by the processor to ignore incoming data packets that do not comprise data packets in the sequence for one or more of the video stream and the audio stream such that the predictive model is not trained on the ignored incoming data packets.

In one embodiment, the code is further executable by the processor to determine the predictive accuracy of the predictive model by determining whether a predicted data packet that is generated using the predictive model matches a corresponding incoming data packet. In certain embodiments, the code is further executable by the processor to receive a request for a forwarded data packet from the one or more network devices in response to expiration of a timeout period at the one or more network devices. The timeout period may include a period of time where the one or more network devices do not receive forwarded data packets.

In one embodiment, the code is further executable by the processor to forward the incoming data packets that are used to train the predictive model to the one or more network devices while the predictive model is trained. In certain embodiments, the one or more network devices is connected to an endpoint device. The one or more network devices may include one or more of a router, a switch, and a network card.

In one embodiment, a method for data packet prediction includes training a predictive model using incoming data packets. The incoming data packets are forwarded to one or more network devices. The predictive model is trained to predict a subsequent data packet based on an input data packet. The method, in further embodiments, includes forwarding the predictive model to the one or more network devices in response to the predictive accuracy of the predictive model satisfying a threshold accuracy. The predictive model may generate predicted data packets at the one or more network devices. The method, in various embodiments, includes ceasing forwarding incoming data packets to the one or more network devices.

In one embodiment, the method includes notifying the one or more network devices to cease accepting forwarded data packets and to start generating predictive data packets using the predictive model. In some embodiments, the method includes periodically sending a synchronization packet to the one or more network devices to indicate to the one or more network devices to continue generating predictive data packets using the predictive model. The synchronization packet may be sent over side-band connections to the one or more network devices.

In one embodiment, the method includes detecting that the predictive accuracy of the predictive model for incoming data packets does not satisfy the threshold accuracy and notifying the one or more network devices to cease generating predictive data packets and to accept forwarded data packets. The notification may be sent using side-band connections to the one or more network devices. In some embodiments, the predictive model comprises a Markov chain model that is trained on the incoming data packets using a Markov chain engine.

In one embodiment, a program product includes a computer readable storage medium that stores code executable by a processor. In certain embodiments, the executable code includes code to train a predictive model using incoming data packets. The incoming data packets are forwarded to one or more network devices. The predictive model is trained to predict a subsequent data packet based on an input data packet. The executable code, in further embodiments, includes code to forward the predictive model to the one or more network devices in response to the predictive accuracy of the predictive model satisfying a threshold accuracy. The predictive model may generate predicted data packets at the one or more network devices. The executable code, in various embodiments, includes code to cease forwarding incoming data packets to the one or more network devices.

FIG. 1 is a schematic block diagram illustrating one embodiment of a system 100 for data packet prediction. In one embodiment, the system 100 includes one or more network devices 101a-b (collectively 101). The network devices 101 may include devices for facilitating network transmissions through the data network 106 from a source to an endpoint. The network devices 101, for instance, may include routers, switches, network cards, bridges, repeaters, access points, gateways, modems, hubs, and/or the like for sending, receiving, forwarding, routing, discarding, or the like network traffic on a wired, wireless, or some combination of wired and wireless data network infrastructure.

In one embodiment, a network device 101 may be a source or origin network device 101a that is connected to a source or origin of the network traffic (such as a datacenter 108). In certain embodiments, a network device 101 may be an endpoint, exit, or destination network device 101b that is connected to an endpoint information handling device 102 that is the final destination for the network traffic.

In one embodiment, the system 100 includes one or more information handling devices 102. As used herein, the information handling device 102 may also be known as endpoints 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, an augmented reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. For instance, the information handling devices 102 may be connected to a video streaming service (e.g., Netflix®) or an audio streaming service (e.g., Spotify®) over the data network 106 for consuming streaming video and/or audio. The information handling devices 102, in a further embodiment, may include processors, processor cores, and/or the like that are configured to execute various programs, program code, applications, instructions, functions, and/or the like.

The network traffic apparatus 104, in one embodiment, is configured to dynamically reduce the amount of network traffic that is sent between a source 108 and an endpoint 102. In certain embodiments where the network traffic includes video and/or audio data packets, the data packets that are sent between the source 108 and the endpoints 102 may be redundant data packets. In other words, users at the endpoints 102 may be viewing the same video (e.g., if Netflix® releases a new movie or TV show) or listening to the same audio (e.g., if Spotify® posts a new song by a popular artist) such that the same video and/or audio data is being sent multiple times over the data network 106.

The network traffic apparatus 104, in one embodiment, trains and uses a predictive model, e.g., a machine learning model, an artificial intelligence model, or the like, and uses machine learning algorithms to predict data packets based on previously received data packets. As used herein, machine learning may refer to the algorithms and statistical models that computer systems use to effectively perform a specific task without using explicit instructions. In other words, algorithms and models that allow the computer to learn over time to generate predictions, estimates, forecasts, and/or the like. As it relates to the subject matter disclosed herein, various machine learning algorithms and models may be used such as supervised or unsupervised learning algorithms, feature learning algorithms, decision trees, artificial neural networks, support vector machines, Bayesian networks, genetic algorithms, and/or the like. In certain embodiments, a Markov chain model is used for predicting sequential network traffic. As used herein, a Markov chain is a stochastic model describing a sequence of possible events in which the probability of each event depends only on the state attained in the previous event, and therefore may be utilized to predict the next or subsequent data packet in a series or sequence based on a previously received data packet.

Thus, in one embodiment, the network traffic apparatus 104 is configured to train a predictive model using incoming data packets (either at a source device 108 or at a source network device 101a). During training, the network traffic apparatus 104 may continue to forward the incoming data packets to the destination or endpoint network device 101b. The network traffic apparatus 104, in some embodiments, forwards the predictive model to the endpoint network devices 101b (or other network devices 101 in the network 106) when the predictive accuracy of the predictive model satisfies a threshold accuracy, and ceases forwarding incoming data packets to the endpoint network devices 101b. The endpoint network devices 101b can then use the predictive model to predict network packets in the sequence based on an input data packet (which may be a previously predicted data packet in the sequence) without receiving data packets from the source network device 101a. Thus, in this manner, the network traffic apparatus 104 reduces the amount of (redundant) network traffic on the data network 106.

In various embodiments, the network traffic apparatus 104 may be embodied as a hardware appliance that can be installed or deployed on an information handling device 102, on a server 108, on a network device 101, or elsewhere on the data network 106. In certain embodiments, the network traffic apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the network traffic apparatus 104 may include a power interface, a wired and/or wireless network interface, a graphical interface that attaches to a display, and/or a semiconductor integrated circuit device as described below, configured to perform the functions described herein with regard to the network traffic apparatus 104.

The network traffic apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the network traffic apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the network traffic apparatus 104.

The semiconductor integrated circuit device or other hardware appliance of the network traffic apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the network traffic apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, hubs, bridges, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. As used herein, the one or more servers 108 may also be known as a datacenter 108, a source or origin computing device(s) 108, and/or the like. The one or more servers 108 may be communicatively coupled (e.g., networked) over a data network 106 to one or more information handling devices 102. For instance, a server 108 may be a video or audio streaming source and may send video or audio data packets to an information handling device 102 over the data network 106 using the network devices 101 for facilitating the transmission of the data packets.

Figure 2:
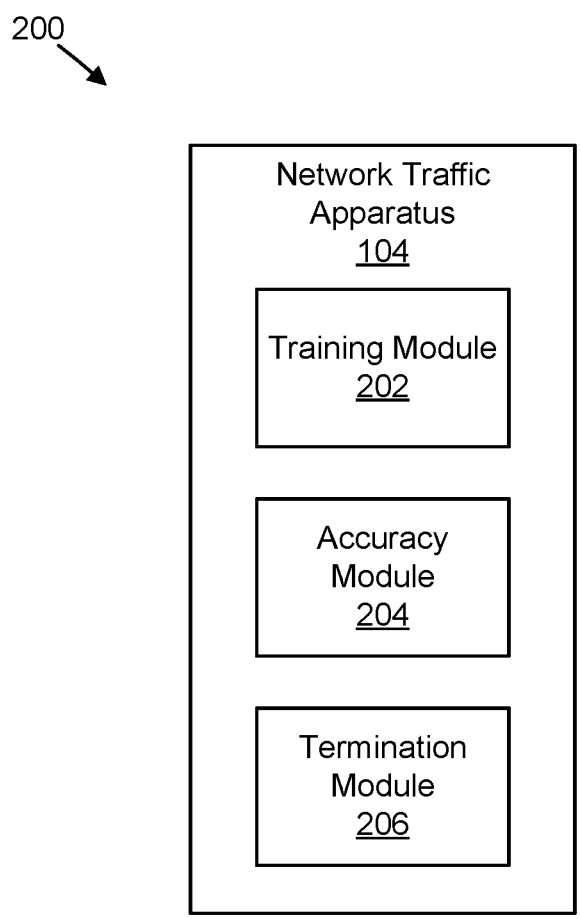
FIG. 2 is a schematic block diagram illustrating one embodiment of an apparatus for data packet prediction.

FIG. 2 is a schematic block diagram illustrating one embodiment of an apparatus 200 for data packet prediction. In one embodiment, the apparatus 200 includes an instance of a network traffic apparatus 104. In certain embodiments, the network traffic apparatus 104 includes one or more of a training module 202, an accuracy module 204, and a termination module 206, which are described in more detail below.

The training module 202, in one embodiment, is configured to train a predictive model using incoming data packets. The training module 202 may be located at an origin or source network device 101*a*. As described above, the predictive model may be a machine learning or artificial intelligence model that is used with one or more machine learning algorithms. Training the predictive model may refer to the process of providing the machine learning algorithm/model with training data to learn from. In some embodiments, the training data contains the "correct answer", e.g., the target or target attribute. The machine learning algorithm finds patterns in the training data that map the input data attributes to the target, e.g., the desired prediction, and it generates a predictive model that captures the patterns. Thus, when an input is provided to the predictive model that has been trained on data similar to the input data, the predictive model generates an accurate output prediction.

As it relates to the subject matter herein, the training module 202 trains the predictive model, in one embodiment, using incoming data packets that are received at the source network device 101*a*. For example, the training module 202 may use a machine learning engine located at a source network device 101a to train a predictive model on data packets that are received from the source device(s) 108. As incoming data packets are received, the training module 202 may feed or input the incoming data packets to the machine learning engine to train the predictive model. At the same time, the incoming data packets that are used to train the predictive model may be forwarded on to their destination through the data network 106.

In certain embodiments, the training module 202 discriminates between data packets that are used to train the predictive model based on different characteristics of the data packets such as the source of the data packets, the destination of the data packets, the payload of the data packets, the encryption and/or compression characteristics of the data packets, and/or the like. For instance, in certain embodiments, the training module 202 may intercept, read, or otherwise capture and perform deep packet inspection on data packets that are part of a video stream or an audio stream, e.g., data packets that are part of a sequence or series, while ignoring other data packets. In such an embodiment, the data packets may carry sequential video or audio data packets, e.g., data packets that are ordered, arranged, or processed in a particular sequence, order, or series.

In certain embodiments, a predictive model that is trained using sequential data packets may be configured to predict a subsequent data packet in the sequence based on an input data packet, e.g., an incoming or received data packet or a data packet that the predictive model generates. In such an embodiment, the predictive model may include a Markov chain model that is trained on incoming, sequential data packets using a Markov chain engine. As described above, a Markov chain model is a stochastic model describing a sequence of possible events in which the probability of each event depends only on the state attained in the previous event, and therefore may be utilized to predict the next or subsequent data packet in a series or sequence based on a previously received data packet or a predicted data packet that is generated using the Markov chain model. In other words, the output from the Markov chain model, e.g., a predicted data packet in the sequence can be used as input into the same Markov chain model to generate the next predicted data packet in the sequence, which makes Markov chain models appropriate for predicting data packets in a sequences/series.

In further embodiments, the training module 202 ignores, discards, forwards, and/or the like data packets that do not have characteristics of data packets that are being used for training the predictive model (e.g., data packets for video and/or audio data streams), that are not a part of a sequence of data packets, and/or the like. In this manner, the predictive model is not trained on data that is not of interest to the network traffic apparatus 104, but the network device 101a may continue to forward the ignored data packets to their destination through the data network 106.

The accuracy module 204, in one embodiment, is configured to forward the predictive model to the endpoint network device 101b in response to the predictive accuracy of the predictive model satisfying a threshold accuracy. In one embodiment, during training of the predictive model, the predictive model may concurrently, simultaneously, or subsequently be used to predict the next data packet based on the incoming data packet that is used to train the predictive model, e.g., a data packet that is fed into the predictive model. When the next incoming data packet is received from the source 108, the incoming data packet is compared to the data packet that the predictive model predicted to determine if the data packets match.

In one embodiment, the comparison match is performed on a per-bit basis, a per-byte basis, and/or the like. Accordingly, the accuracy module 204 may determine what percentage of the bits, bytes, or the like match between the predicted data packet and the corresponding incoming data packet. Other measurements of accuracy may be used such as an average over a number of data packets, a total number of bits/bytes that match, and/or the like. Furthermore, the comparison may be based on the payload data of the data packets, ignoring other extraneous header information.

If the determined accuracy satisfies a threshold accuracy, the accuracy module 204 may send, or cause to be sent, the predictive model to one or more endpoint network devices 101b, where the predictive model can be used to generate predictive data packets based on an input data packet in the series/sequence (e.g., a data packet that the predictive model previously generated) instead of requiring every data packet that the source network device 101a receives to be forwarded to the endpoint network device 101b.

In one embodiment, the threshold accuracy may be set by a user, may be based on the type of data that is being transmitted, or the like. For instance, streaming video or audio data may not require a 100% match accuracy, thus, the threshold accuracy may be set at 90% or more. Other data types may require near 100% accuracy or may be able to be usable at an even lower accuracy.

The accuracy module 204, in some embodiments, may determine the accuracy of the predictive model over a period of time, after a certain number of data packets have been compared, or the like. For instance, the accuracy module 204 may determine the number of predicted data packets satisfy the threshold accuracy for every 100 data packets, and if the number of predicted data packets that satisfy the threshold accuracy satisfies a second threshold, e.g., a comprehensive threshold, then the predictive model may be sent to the endpoint network devices 101b.

In some embodiments, the accuracy module 204 checks the accuracy of the predictive model on an ongoing basis. For instance, the accuracy module 204 may check the accuracy of the predictive model for every incoming data packet that is received, for every X number of data packets that are received, after a predetermined period of time, and/or the like. In further embodiments where a Markov chain model is used, the accuracy module 204 may verify the accuracy of the Markov chain model in response to the Markov chain model indicating that it can no longer accurately predict data packets. This is due to the inherent or built-in ability of the Markov chain model to discern when its confidence or accuracy of the predicted data packet is low.

The termination module 206, in one embodiment, is configured to cease forwarding incoming data packets to the endpoint network device 101b in response to the prediction model being sent to the endpoint network device 101b. In one embodiment, the termination module 206 prevents, ceases, or stops sending data packets to the endpoint network device 101b that are from the same sequence as the data packets that the predictive model was trained on (e.g., the video or audio stream) such that other data packets that are not associated with or related to the predictive model are still forwarded to the endpoint network device 101b.

In such an embodiment, the termination module 206 may check whether the data packet is from a source and/or is of a type that the predictive model was trained on and whether the data packet is part of a sequence of series of data packets that the predictive model was trained on. If so, the termination module 206 determines the endpoint network device 101b that is associated with the destination for a data packet and further determines whether the endpoint network device 101b comprises and/or is using a predictive model to generate predicted data packets. For instance, the termination module 206 may ping the endpoint network device 101b to check if it is using an instance of the predictive model, may check a local table or database to determine if the endpoint network device 101b was sent an instance of the predictive model, and/or the like. If so, then the termination module 206 may discard, ignore, or otherwise not forward the data packet to the endpoint network device 101b.

In this manner, the amount of network traffic or data packets sent on the network is reduced, overall, in a dynamic fashion using machine learning because data packets of a sequence or series can be predicted at an endpoint network device 101b where a predicted data packet is sent to the endpoint information handling device 102 to be processed while also acting as input into the predictive model to generate the next predictive data packet in the sequence/series.

Figure 3:
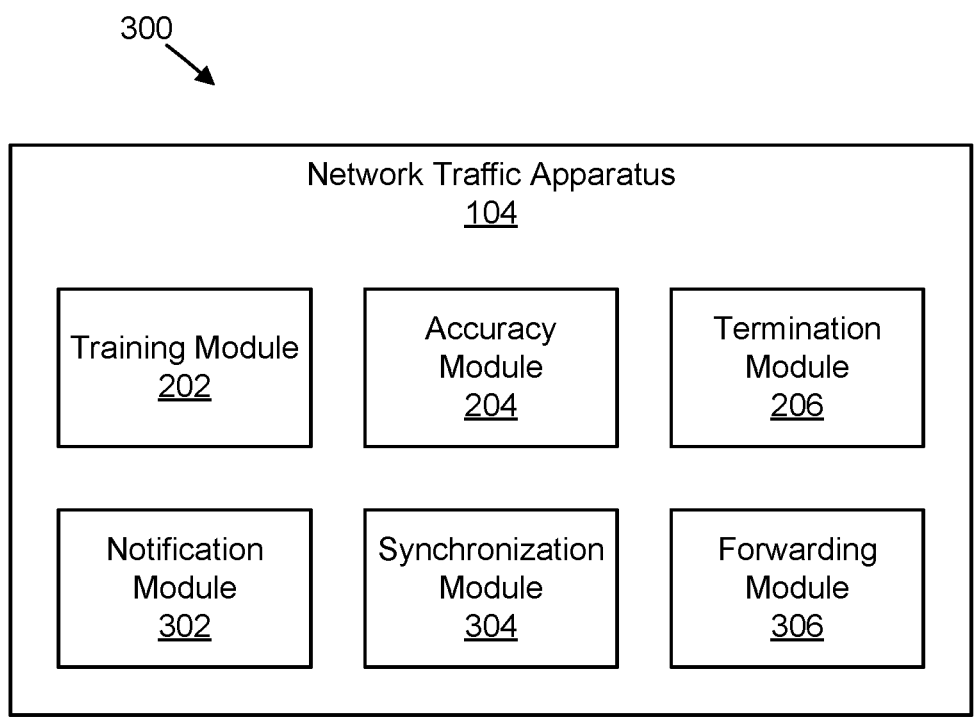
FIG. 3 is a schematic block diagram illustrating one embodiment of another apparatus for data packet prediction.

FIG. 3 is a schematic block diagram illustrating one embodiment of another apparatus 300 for data packet prediction. In one embodiment, the apparatus 300 includes an instance of a network traffic apparatus 104. In certain embodiments, the network traffic apparatus 104 includes one or more of a training module 202, an accuracy module 204, and a termination module 206, which may be substantially similar to the training module 202, the accuracy module 204, and the termination module 206 described above with reference to FIG. 2. In further embodiments, the network traffic apparatus 104 includes one or more of a notification module 302, a synchronization module 304, and a forwarding module 306, which are described in more detail below.

In one embodiment, the notification module 302 is configured to notify the network device 101b to cease accepting forwarded data pack and to start generating predictive data packets using the predictive model. In certain embodiments, in response to the predictive model being sent to the endpoint network device 101b to generate predictive data packets, the notification module 302 may send a signal, message, notification, alert, event, or the like to the endpoint network device 101b to trigger it to stop receiving data packets that are being predicted using the predictive model. In this manner, if incoming data packets are received that are also being generated using the predictive model, the incoming data packets can be ignored, discarded, or otherwise prevented from being propagated through the data network 106 or to the endpoint information handling device 102.

In one embodiment, the notification module 302 may send other types of notifications to an endpoint network device 101b. For instance, if the accuracy module 204 determines that the accuracy of the predictive model no longer satisfies the accuracy threshold, the accuracy model 204 may trigger, cause, or direct the notification module 302 to send a notification to the endpoint network device(s) 101b that is using the predictive model to stop or cease generating predictive data packets using the predictive model and to instead accept incoming, forwarded data packets from the source network device 101a that were otherwise being generated by the predictive model.

In certain embodiments, the notification module 302 sends notifications or other messages to an endpoint network device 101b using a side channel or out-of-band channel. For instance, the notification module 302 may send notifications to an endpoint 101b on a particular port, address, or other identifier for the side channel. In this manner, the endpoint network device 101b will not inadvertently ignore or disregard the messages that the notification module 302 sends.

In one embodiment, the synchronization module 304 is configured to periodically send a synchronization packet to the endpoint network device 101b to indicate to the endpoint network device 101b to continue generating predictive data packets using the predictive model. In some embodiments, the endpoint 101b will continue to generate predictive data packets using the predictive model until a condition is met such as a timeout period has expired (explained below), until a predetermined number of predictive data packets have been generated, and/or the like. However, the timeout period and/or the data packet counts may be reset in response to receiving a synchronization data packet from the synchronization module 304. The synchronization packet may be sent over a side-band connection to the network device 101b, similar to the side-band channel described above with reference to the notification module 302.

In one embodiment, the forwarding module 306 is configured to periodically forward incoming data packets to the endpoint network device 101b to be used to determine the predictive accuracy of the predictive model at the endpoint network device 101b. In such an embodiment, the accuracy module 204 determines the accuracy between the forwarded data packets and the predicted data packets to determine whether the predictive model at the endpoint network device 101b is still generating accurate predicted data packets. In one embodiment, the forwarding module 306 forwards the data packets to the endpoint network device 101b over a side-band channel, similar to the side-band channel described above with reference to the notification module 302.

In one embodiment, the forwarding module 306 may send a new, updated, revised, or the like version of the predictive model to the endpoint network device 101b in response to the predictive model being further trained on new incoming data packets. As described above, the training module 202 may continuously train or update the predictive model on new data packets that are received at the origin network device 101a, and the forwarding module 306 may periodically forward instances of the predictive model to endpoint network devices 101b, assuming the accuracy module 204 verifies that the updated predictive model satisfies the accuracy threshold.

In further embodiments where the predictive model is a Markov chain model, the forwarding module 306 may periodically, e.g., after a predefined period of time, forward incoming data packets from the origin or source network device 101a to an endpoint network device 101b that has an instance or copy of the Markov chain model that is being used to generate predictive data packets to restart, refresh, or the like the Markov chain that the Markov chain model uses. For instance, because the data packet is a real data packet and not a predicted data packet, the data packet may refresh or restart the Markov chain sequence.

In one embodiment, the forwarding module 306 receives a request from an endpoint network device 101b for a forwarded data packet from the origin network device 101a in response to expiration of a timeout period at the endpoint network device 101b. In such an embodiment, a timeout period may be established at each of the endpoint network devices 101b where no data packets in a sequence or series of data packets are received from the origin network device 101a and data packets are generated using the predictive model. Upon expiration of the timeout period, however, the predictive model may cease predicting data packets so that the predictive model does not continuously predict data packets without end. In response to the expiration of the timeout period, the forwarding module 306 may request new data packets from an upstream network device 101 such as the origin network device 101a.

Figure 4:
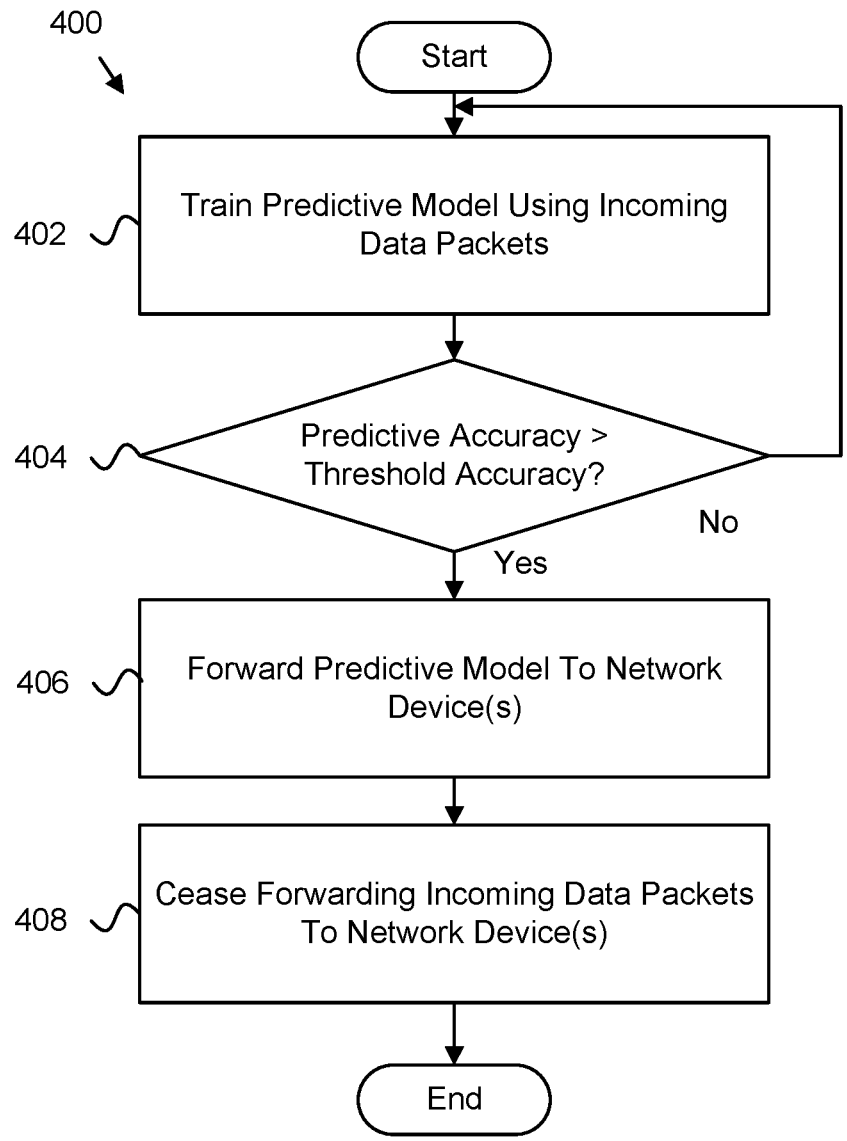
FIG. 4 is a schematic flow chart diagram illustrating one embodiment of a method for data packet prediction.

FIG. 4 is a schematic flow chart diagram illustrating one embodiment of a method 400 for data packet prediction. In one embodiment, the method 400 begins and trains 402 a predictive model using incoming data packets. The incoming data packets may be forwarded to a network device 101, such as an endpoint network device 101b. The predictive model may be trained to predict a subsequent data packet based on the incoming data packets.

In some embodiments, the method 400 determines 404 whether the predictive accuracy of the predictive model satisfies a threshold accuracy. If not, in one embodiment, the method 400 continues to train 402 the predictive model on incoming data packets. Otherwise, in further embodiments, the method 400 forwards 406 the predictive model to one or more network devices 101, such as endpoint network devices 101b. In one embodiment, the method 400 ceases 408 forwarding incoming data packets to the network device 101, and the method 400 ends. In some embodiments, the training module 202, the accuracy module 204, and the termination module 206 perform the various steps of the method 400.

Figure 5:
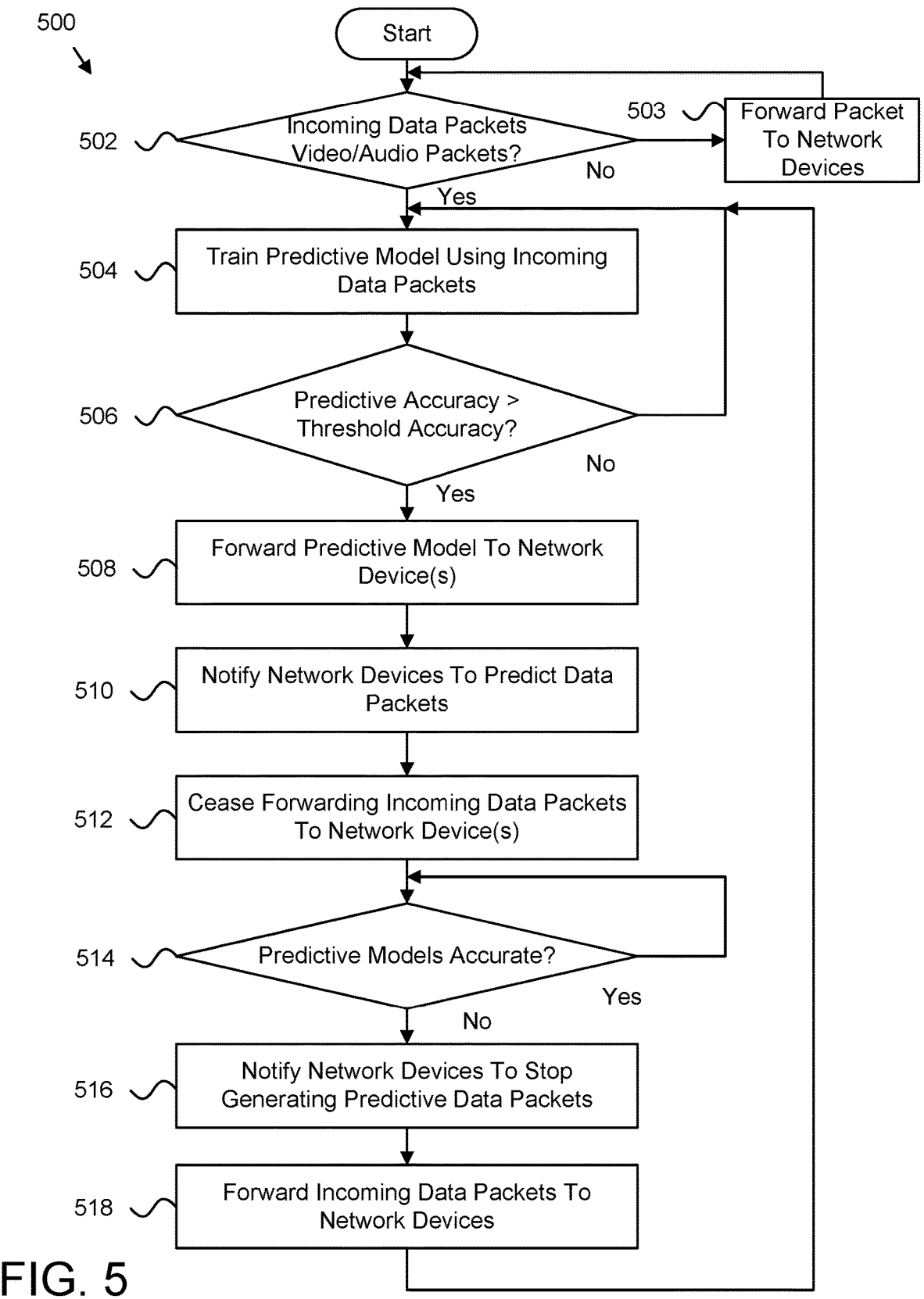
FIG. 5 is a schematic flow chart diagram illustrating one embodiment of another method for data packet prediction.

FIG. 5 is a schematic flow chart diagram illustrating one embodiment of another method 500 for data packet prediction. In one embodiment, the method 500 begins and determines 502, at an origin/source network device 101a (e.g., a router connected to a source device 108) whether incoming/received data packets comprise audio or video data packets of a sequence. If not, the method 500, in some embodiments, forwards 503 the data packet to downstream network devices 101, e.g., an endpoint network device 101b, and continues to check 502 whether incoming/received data packets comprise audio or video data packets of a sequence. Otherwise, the method 500, in certain embodiments, trains 504 a predictive model using incoming data packets.

In some embodiments, the method 500 determines 506 whether the predictive accuracy of the predictive model satisfies a threshold accuracy. If not, in one embodiment, the method 500 continues to train 504 the predictive model. Otherwise, in further embodiments, the method 500 forwards 508 the predictive model to one or more network devices 101, such as endpoint network devices 101b.

In one embodiment, the method 500 notifies 510 the network device 101b that it should use the predictive model to predict data packets for the sequence/series and ceases 512 forwarding incoming data packets to the network device 101b. The method 500 determines 514 whether the predictive model is still accurate and does so until the predictive accuracy of the predictive model does not satisfy the threshold accuracy. In one embodiment, if the method 500 determines that the predictive model is no longer accurate, the method notifies 516 the network device 101b to stop generating predictive data packets using the predictive model.

In certain embodiments, the method 500 resumes forwarding 518 data packets from the origin network device 101a to the endpoint network devices 101b, and the method 500 continues to train 504 the predictive model until its predictive accuracy satisfies the threshold accuracy. In certain embodiments, the training module 202, the accuracy module 204, the termination module 206, the notification module 302, and the forwarding module 306 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor;
a memory that stores code executable by the processor to:
train a machine learning predictive model on incoming data packets of a data stream, the incoming data packets forwarded to one or more network devices while the predictive model is trained, the predictive model trained to predict a subsequent data packet based on an input data packet of the data stream;
determine a predictive accuracy of the predictive model by comparing an incoming data packet of the data stream with a predicted data packet that is generated using the predictive model;
forward the predictive model to the one or more network devices in response to the predictive accuracy of the predictive model satisfying a threshold accuracy; and
cease forwarding incoming data packets of the data stream to the one or more network devices, the predictive model at each of the one or more network devices generating predicted data packets for the data stream based on a previously generated predicted data packet without reference to new incoming data packets from the data stream.

2. The apparatus of claim 1, wherein the code is further executable by the processor to notify the one or more network devices to:
cease accepting forwarded data packets; and
start generating predictive data packets using the predictive model.

3. The apparatus of claim 1, wherein the code is further executable by the processor to periodically send a synchronization packet to the one or more network devices to indicate to the one or more network devices to continue generating predictive data packets using the predictive model, the synchronization packet sent over side-band connections to the one or more network devices.

4. The apparatus of claim 1, wherein the code is further executable by the processor to:
detect that the predictive accuracy of the predictive model for incoming data packets does not satisfy the threshold accuracy; and
notify the one or more network devices to cease generating predictive data packets and to accept forwarded data packets, the notification sent using side-band connections to the one or more network devices.

5. The apparatus of claim 1, wherein the code is further executable by the processor to continue training the predictive model on new incoming data packets.

6. The apparatus of claim 5, wherein the code is further executable by the processor to:
periodically forward incoming data packets to the one or more network devices to determine the predictive accuracy of the predictive model at the one or more network devices; and send a new version of the predictive model that is trained on the new incoming data packets to the one or more network devices for generating predictive data packets.

7. The apparatus of claim 1, wherein the predictive model comprises a Markov chain model that is trained on the incoming data packets using a Markov chain engine.

8. The apparatus of claim 7, wherein the code is further executable by the processor to forward new incoming data packets to the one or more network devices after a predefined period of time to restart the Markov chain at the one or more network devices.

9. The apparatus of claim 1, wherein the incoming data packets comprise sequential data packets for one or more of a video stream and an audio stream.

10. The apparatus of claim 9, wherein the code is further executable by the processor to ignore incoming data packets that do not comprise data packets in the sequence for one or more of the video stream and the audio stream such that the predictive model is not trained on the ignored incoming data packets.

11. The apparatus of claim 1, wherein the code is further executable by the processor to determine the predictive accuracy of the predictive model by determining whether a predicted data packet that is generated using the predictive model matches a corresponding incoming data packet.

12. The apparatus of claim 1, wherein the code is further executable by the processor to receive a request for a forwarded data packet from the one or more network devices in response to expiration of a timeout period at the one or more network devices, the timeout period comprising a period of time where the one or more network devices do not receive forwarded data packets.

13. The apparatus of claim 1, wherein the code is further executable by the processor to forward the incoming data packets that are used to train the predictive model to the one or more network devices while the predictive model is trained.

14. The apparatus of claim 1, wherein the one or more network devices are connected to an endpoint device, the one or more network devices comprising one or more of a router, a switch, and a network card.

15. A method, comprising:
    training, by use of a processor, machine learning predictive model on incoming data packets of a data stream, the incoming data packets forwarded to one or more network devices while the predictive model is trained, the predictive model trained to predict a subsequent data packet based on an input data packet of the data stream;
    determining a predictive accuracy of the predictive model by comparing an incoming data packet of the data stream with a predicted data packet that is generated using the predictive model;
    forwarding the predictive model to the one or more network devices in response to the predictive accuracy of the predictive model satisfying a threshold accuracy; and
    ceasing forwarding incoming data packets of the data stream to the one or more network devices, the predictive model at each of the one or more network devices generating predicted data packets for the data stream based on a previously generated predicted data packet without reference to new incoming data packets from the data stream.

16. The method of claim 15, further comprising notifying the one or more network devices to:
    cease accepting forwarded data packets; and
    start generating predictive data packets using the predictive model.

17. The method of claim 15, further comprising periodically sending a synchronization packet to the one or more network devices to indicate to the one or more network devices to continue generating predictive data packets using the predictive model, the synchronization packet sent over side-band connections to the one or more network devices.

18. The method of claim 15, further comprising:
    detecting that the predictive accuracy of the predictive model for incoming data packets does not satisfy the threshold accuracy; and
    notifying the one or more network devices to cease generating predictive data packets and to accept forwarded data packets, the notification sent using side-band connections to the one or more network devices.

19. The method of claim 15, wherein the predictive model comprises a Markov chain model that is trained on the incoming data packets using a Markov chain engine.

20. A program product comprising a non-transitory computer readable storage medium that stores code executable by a processor, the executable code comprising code to:
    train a machine learning predictive model on incoming data packets of a data stream, the incoming data packets forwarded to one or more network devices while the predictive model is trained, the predictive model trained to predict a subsequent data packet based on an input data packet of the data stream;
    determine a predictive accuracy of the predictive model by comparing an incoming data packet of the data stream with a predicted data packet that is generated using the predictive model;
    forward the predictive model to the one or more network devices in response to the predictive accuracy of the predictive model satisfying a threshold accuracy; and
    cease forwarding incoming data packets of the data stream to the one or more network devices, the predictive model at each of the one or more network devices generating predicted data packets for the data stream based on a previously generated predicted data packet without reference to new incoming data packets from the data stream.

* * * * *